United States Patent
Abe et al.

(10) Patent No.: US 10,222,519 B2
(45) Date of Patent: Mar. 5, 2019

(54) COMPOSITE SILICA GLASS MADE LIGHT DIFFUSION MEMBER

(71) Applicant: COORSTEK KK, Tokyo (JP)

(72) Inventors: Yuki Abe, Hadano (JP); Takeshi Iwasaki, Hadano (JP); Akira Kanno, Hadano (JP); Sotaro Takeda, Hadano (JP); Yutaka Hashimoto, Hadano (JP)

(73) Assignee: COORSTEK KK, Tokyo (JP)

( * ) Notice: Subject to any disclaimer, the term of this patent is extended or adjusted under 35 U.S.C. 154(b) by 181 days.

(21) Appl. No.: 15/446,915

(22) Filed: Mar. 1, 2017

(65) Prior Publication Data
US 2017/0261657 A1 Sep. 14, 2017

(30) Foreign Application Priority Data

Mar. 10, 2016 (JP) .................................. 2016-046569
Feb. 1, 2017 (JP) .................................. 2017-016833

(51) Int. Cl.
B32B 15/04 (2006.01)
B32B 17/06 (2006.01)
G02B 5/02 (2006.01)
C03C 17/02 (2006.01)
C03C 3/06 (2006.01)
C03C 1/00 (2006.01)
C03C 17/00 (2006.01)

(52) U.S. Cl.
CPC ............ *G02B 5/0242* (2013.01); *C03C 1/008* (2013.01); *C03C 3/06* (2013.01); *C03C 17/007* (2013.01); *C03C 17/02* (2013.01); *G02B 5/0268* (2013.01); *G02B 5/0278* (2013.01); *C03C 2217/425* (2013.01); *C03C 2218/113* (2013.01)

(58) Field of Classification Search
USPC ....... 428/304.4, 315.5, 315.9, 332, 428, 688
See application file for complete search history.

(56) References Cited

U.S. PATENT DOCUMENTS

2013/0022509 A1* 1/2013 Tawarayama .......... B01D 69/10
422/310
2017/0261657 A1* 9/2017 Abe ....................... C03C 17/007

FOREIGN PATENT DOCUMENTS

JP 2014-114186 A 6/2014

* cited by examiner

*Primary Examiner* — Lauren R Colgan
(74) *Attorney, Agent, or Firm* — McGinn IP Law Group, PLLC.

(57) ABSTRACT

A composite silica glass made light diffusion member includes a dense silica glass, and a porous silica glass which has been layered on the surface of the dense silica glass. The porous silica glass is a porous body and has a homogeneous pore distribution. The porous body has a framework including a plurality of spherical silica glasses, contains a communicating pore part formed by spaces among them, and has a central pore size of 10 to 20 μm and a porosity of 25 to 40%. The spherical silica glasses have an average diameter of 30 to 100 μm. An average value of a specific arithmetic average roughness Ra in each of the spherical silica glass exposed on an outer surface of the porous silica glass is 0.8 to 4.0 nm.

4 Claims, 2 Drawing Sheets

COMPOSITE SILICA GLASS MADE LIGHT DIFFUSION MEMBER

TECHNICAL FIELD

The present invention relates to a composite silica glass made light diffusion member particularly used in diffusion of ultraviolet rays or light of light source containing ultraviolet rays.

BACKGROUND ART

Light diffusion member generally includes a light diffusion member including a light-transmitting substrate having present therein fine particles or gas bubbles having a refractive index different from that of the substrate, and a light diffusion member including a light-transmitting substrate, such as a ground glass, having provided on the surface thereof fine irregularities by a treatment such as sandblasting or etching. Those light diffusion members scatter or diffuse light such as ultraviolet rays by fine particles in the substrate or fine irregular shape of the surface thereof.

In a light diffusion member containing fine particles having a refractive index different from that of a substrate, a degree of light diffusion can be changed by the refractive index of the particles, shape of the particles or concentration of the particles. However, light transmittance thereof is generally about 40 to 60%, and transmission loss of light is large. Furthermore, in a light diffusion member, like a ground glass, including a substrate having provided on the surface thereof fine irregularities, ultraviolet rays can be diffused, but a diffusion angle is narrow and it is difficult to obtain sufficient diffusibility.

As the light diffusion member, for example, Patent Document 1 discloses a silica bonded body formed by bonding plural silica porous bodies to each other or bonding a silica porous body to a silica dense body such as a quartz glass through a silica powder. Patent Document 1 discloses that to bond the silica porous body to the silica dense body, a silica powder having the same quality as those materials is used, and thus the silica bonded body in which those are bonded with high bonding strength is obtained without clogging the whole pores of the porous body.

However, in the silica bonded body described in the Patent Document 1, a silica dense body being a quartz glass is bonded to the silica porous body after producing each of those. Therefore, lead time of processing is long, costs are increased, and productivity was not said to be sufficient. Furthermore, an adhesive layer using a silica powder is present in the vicinity of an interface between the silica dense body and the silica porous body. Therefore, in the silica bonded body, transmission efficiency of ultraviolet rays tends to be deteriorated, and additionally the thickness of the adhesive layer in which a silica powder intervenes tends to be heterogeneous. Thus, in-plane uniformity of the intensity of ultraviolet rays emitted from a spot light source was not sufficient.

PRIOR ART DOCUMENTS

Patent Document

Patent Document 1: JP-A-2014-114186

SUMMARY OF THE INVENTION

Problems that the Invention is to Solve

The present invention has an object to provide a composite silica glass made light diffusion member constituted of a composite including a dense silica glass and a porous silica glass, having excellent transmittance of ultraviolet rays and reduced in-plane variation of ultraviolet intensity.

Means for Solving the Problems

A composite silica glass made light diffusion member of the present invention includes a dense silica glass and a porous silica glass, in which the porous silica glass has been layered on the surface of the dense silica glass, the porous silica glass is a porous body which has a framework including a plurality of spherical silica glasses, contains a communicating pore part formed by spaces among them, and has a central pore size of 10 to 20 μm and a porosity of 25 to 40%, the spherical silica glasses have an average diameter of 30 to 100 μm, and an average value obtained by measuring 10 times an arithmetic average roughness Ra per measurement length of 1 μm in each of the spherical silica glass exposed on an outer surface of the porous silica glass is 0.8 to 4.0 nm, and the porous silica glass has a homogeneous pore distribution from an interface with the dense silica glass to the outer surface of the porous silica glass.

The spherical silica glass preferably has a cross-sectional circularity of 0.80 or more.

The porous silica glass preferably has contents of Na, Mg, Al, K, and Fe of 0.2 ppm or less each, and a content of Cu of 0.05 ppm or less.

Effects of the Invention

The composite silica glass made light diffusion member of the present invention has the above constitution, and therefore enables to have excellent transmittance of ultraviolet rays and to increase in-plane uniformity of ultraviolet intensity.

MODE FOR CARRYING OUT THE INVENTION

Figure 1:
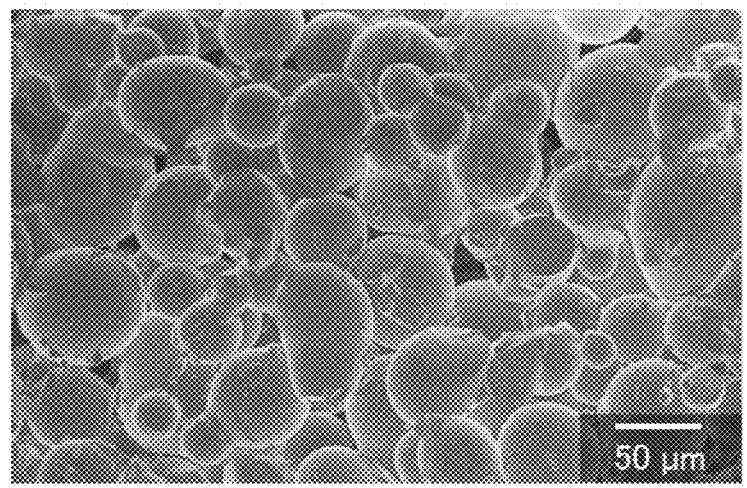
FIG. 1 is an SEM photograph of a porous silica glass part when the composite silica glass made light diffusion member of the present invention is cut in a thickness direction.

The present invention is described in detail below.

The composite silica glass made light diffusion member of the present invention includes a dense silica glass and a porous silica glass formed on the surface of the dense silica glass, in which the porous silica glass is a porous body having a framework including a plurality of spherical silica glasses, containing a communicating pore part formed by spaces thereof and having a central pore size of 10 to 20 μm and a porosity of 25 to 40%, the spherical silica glasses has an average diameter of 30 to 100 μm, an average value obtained by measuring 10 times an arithmetic average roughness Ra per measurement length of 1 μm in each spherical silica glass exposed on an outer surface is 0.8 to 4.0 nm, and the porous silica glass has a homogeneous pore distribution from an interface with the dense silica glass to the outer surface.

In the composite silica glass made light diffusion member of the present invention, the porous silica glass is located on the surface of the dense silica glass. The composite silica glass made light diffusion member of the present invention is preferably free of an adhesive such as a silica powder and preferably consists of the dense silica glass and the porous silica glass.

The porous silica glass has a skeletal structure including a plurality of spherical silica glasses. In a porous body composed of a non-spherical skeleton using a silica glass ground product, variation is easy to cause in the intensity of ultraviolet rays emitted from a light source. Therefore, the skeletal structure of the porous silica glass is preferred to be a skeletal structure of spherical silica glasses. In the composite silica glass made light diffusion member of the present invention, the porous silica glass formed on the surface of the dense silica glass is a porous body containing communicating pore parts formed by spaces thereof and having a central pore size of 10 μm to 20 μm and a porosity of 25 to 40%. Where the central pore size is less than 10 μm or the porosity is less than 25%, transmittance of ultraviolet rays to be emitted is insufficient and efficiency is poor. On the other hand, where the central pore size exceeds 20 μm or the porosity exceeds 40%, strength of the porous silica glass is low, practical use is poor and additionally diffusibility of ultraviolet rays is insufficient.

The spherical silica glass is preferably a solid and transparent glass structure because this can further increase the transmittance of ultraviolet rays and can make further homogeneous.

The central pore size used herein means a central value of spaces formed among particles in the porous silica glass, and communicating pore sizes in which pores are connected to each other.

The spherical silica glass is a spherical body having an average diameter of 30 to 100 μm, and preferably 50 to 80 μm. Where the average diameter is less than 30 μm, transmittance of ultraviolet rays is insufficient. When silica glass particles (raw material) containing a large amount of particles having a particle diameter of less than 30 μm is used in order to control the average diameter to be less than 30 μm, shrinkage during sintering is high, stress concentration is generated, and a porous silica glass has warpage and cracks, which cannot be used as a light diffusion member. On the other hand, where the average diameter exceeds 100 μm, diffusibility of ultraviolet rays is insufficient, and additionally, due to poor strength of a porous body, there is a disadvantage such that dropping out of particles occurs. The minimum value of the particle diameter of the spherical silica glass is preferably 10 μm, and the maximum value thereof is preferably 250 μm. It is more preferred to have one peak value of a particle size distribution within this range. By this, in-plane uniformity of ultraviolet transmission can be obtained, and stabilized diffusion light can be realized.

It is further preferred in the porous silica glass that the average diameter of the spherical silica glasses constituting the framework thereof is 30 to 100 μm, the central pore size of the communicating pore parts formed by spaces in the framework is 10 to 20 μm, and the central pore size has the relationship of 20%±5% of the average diameter. This can further increase emission efficiency of ultraviolet rays from a light source and additionally can further increase diffusibility of ultraviolet rays emitted.

In the spherical silica glass, an average value obtained by measuring 10 times arithmetic average roughness Ra per measurement length of 1 μm in each spherical silica glass exposed on an outer surface is 0.8 to 4.0 nm, and preferably 2.0 to 3.0 nm. This can increase transmission properties of ultraviolet rays from a light source, can further increase emission efficiency of ultraviolet rays and additionally can further increase scattering of ultraviolet rays to be emitted.

The porous silica glass has homogeneous pore distribution from the interface with the dense silica glass to the outer surface thereof. This can provide a composite silica glass made light diffusion member in which, when ultraviolet rays enters therein, in-plane variation of the intensity of ultraviolet rays emitted from the porous silica glass is low.

The homogeneous pore distribution means that unlike in the above-described conventional art, in which a silica powder intervenes densely or dispersedly in pore parts of the porous glass in the vicinity of the interface and as a result, the pore size and/or porosity differs exceeding 5% between in the vicinity of the interface and the vicinity of the outer surface, homogeneity of 5% or less is maintained. This can remarkably reduce in-plane variation of the intensity of ultraviolet rays emitted.

It is preferred in the composite silica glass made light diffusion member of the present invention that cross-sectional circularity in an optional cross-section of the spherical silica glass is 0.80 or more and 1.0 or less. When the cross-sectional circularity is 0.80 or more, diameter variation of pores formed by a plurality of spherical silica glasses or communicating pore parts formed by spaces of those spherical silica glasses is sufficiently small, and diffusibility of ultraviolet rays after emitted, which is from a light source, can be further increased. It is preferred in the composite silica glass made light diffusion member of the present invention that the contents of Na, Mg, Al, K, and Fe in the porous silica glass each are 0 ppm or more and 0.2 ppm or less, and the content of Cu is 0 ppm or more and 0.05 ppm or less. Those metals may be contained during the production of silica glass spherical particles as a raw material of the porous silica glass. When the contents of those metals are 0 ppm or more and 0.2 ppm or less, or 0 ppm or more and 0.05 ppm or less as described above, even if irradiated with ultraviolet rays, those components do not emit fluorescence and the like and local deterioration of a porous body by ultraviolet rays does not occur. As a result, service life of the composite silica glass made light diffusion member can be prolonged.

The dense silica glass preferably has a porosity of more than 0% and 0.1% or less, and a transmittance of 90% or more and 100% or less to ultraviolet rays having a wavelength of 380 to 450 nm. Due to a layered structure thereof with the porous silica glass, this can secure sufficient use resistance strength, and can constitute the composite silica glass made light diffusion member in which the above-described porous silica glass characteristics have been effectively functioned.

It is preferred that the thickness of the porous silica glass is 0.5 to 3 mm, and the thickness of the dense silica glass is 0.5 to 5 mm. By this combination or the thickness, practical strength can be secured, and additionally the composite silica glass made light diffusion member in which further efficient emission of ultraviolet rays and sufficient diffusibility are achieved can be obtained.

It is more preferred that the porous silica glass has an OH group content of 550 ppm or more and 1000 ppm or less and a Cl content of more than 0 ppm and 1 ppm or less. This can further suppress deterioration with time of the silica glass due to irradiation with ultraviolet rays.

The dense silica glass preferably has a purity equivalent to that of the porous silica glass. Specifically, it is more preferred in the dense silica glass that the contents of Na, Mg, Al, K, and Fe each are 0 ppm or more and 0.2 ppm or less, the content of Cu is 0 ppm or more and 0.05 ppm or less, and those contents of the metals are equivalent to those of the porous silica glass, that is, approximated so that the difference in Na, Mg, Al, K, and Fe with the porous silica glass is 0.04 ppm or less and the difference in Cu with the porous silica glass is 0.01 ppm or less. By this, in integrating the dense silica glass and the porous silica glass, impurities such as the above metals do not thermally diffuse in the porous silica glass to emit fluorescence. Additionally, local deterioration of a porous body by ultraviolet rays can be prevented and a service life of the composite silica glass made light diffusion member can be prolonged.

The composite silica glass made light diffusion member of the present invention is produced by placing a dense silica glass such as quartz glass in a resin mold, casting therein solid and transparent silica glass spherical particles dispersed in a binder, and integrating those at a predetermined temperature.

By using the above method, the dense silica glass and porous silica glass are that only the surfaces thereof are in a molten state, and reach a state that a so-called neck part has been formed at the mutual contact points. As a result, high bonding strength is obtained without using an adhesive such as a silica powder.

The temperature when integrating is generally 1200 to 1350° C. Where the temperature is lower than 1200° C., bonding between the dense silica glass and the porous silica glass is weak, and peeling tends to easily occur. On the other hand, where it exceeds 1350° C., the dense silica glass may devitrify.

By integrating at the above temperature, in the composite silica glass made light diffusion member obtained, the porous silica glass can have a homogeneous pore distribution from the vicinity of the interface with the dense silica glass to the outer surface thereof.

As the binder, conventional various materials can be used. For example, silica sol is preferred from that high purity composite silica glass made light diffusion member is obtained.

In the composite silica glass made light diffusion member produced by the above method, the solid and transparent silica glass spherical particles at the interface between the dense silica glass and the porous silica glass is more preferably bonded to the dense silica glass while maintaining a spherical shape without substantially deforming.

EXAMPLES

Apparatus and method used in the evaluation of the composite silica glass made light diffusion member of the present invention are described below.

Example 1

(Preparation of Silica Sol)

Tetramethyl orthosilicate (TEOS), ultra-pure water, 0.1 mol/L hydrochloric acid, and propylene glycol in a weight ratio of TEOS:ultra-pure water:0.1 mol/L hydrochloric acid: propylene glycol=11.7:9:1:3 were stirred with a stirrer for 2.5 hours, followed by adjusting of the pH to 4.5 to 5.0 with 0.1 mol/L ammonia, thereby preparing silica sol as a binder.

(Production of Composite Silica Glass Made Light Diffusion Member)

Solid and transparent silica glass spherical particles as a raw material powder of a porous silica glass were subjected to wet classification to obtain an average particle diameter of 75 μm, followed by sufficient acid cleaning and drying. Silica sol was mixed with the raw material powder in a weight ratio of 5:12, and the resulting slurry mixture was dispersed by using an ultrasonic cleaning machine. A quartz glass plate-shaped body (outer diameter: 20 mm, thickness: 2 mm) was placed on the lower part of a resin mold, and the dispersion was cast from the upper part thereof, followed by standing at 50° C. for 3 hours to form a gel. An integrated body of the gel and the quartz glass plate-shaped body was released from the mold, and was burned by heating up to a temperature of 1300° C. in a temperature rising rate of 0.5° C./min using a high purity alumina material as a burning tool and holding for 12 hours, followed by processing such that the thickness of the porous silica glass is 1 mm. The burned body obtained was cleaned with pure water and then dried.

The composite silica glass made light diffusion member thus obtained was free of peeling and the like, and the bonding was good.

(Evaluation)

(1) Structure Observation

The composite silica glass made light diffusion member obtained was cut in a thickness direction, and a porous body part was observed with SEM apparatus. As a result, as shown in FIG. 1, a porous structure having a framework in which solid and transparent silica glass spherical particles were bonded to each other, and communicating holes had been formed in the spaces therebetween could be confirmed.

A structure in which spherical particles were partially welded was confirmed in the SEM photograph, but this is a structure having been mixed during the production stage of the raw material (solid and transparent silica glass spherical particles). It is preferred in the present invention that such particle materials are not present, but 10% or less, and preferably 5% or less, per total numbers of spherical particles is allowed.

Figure 2:
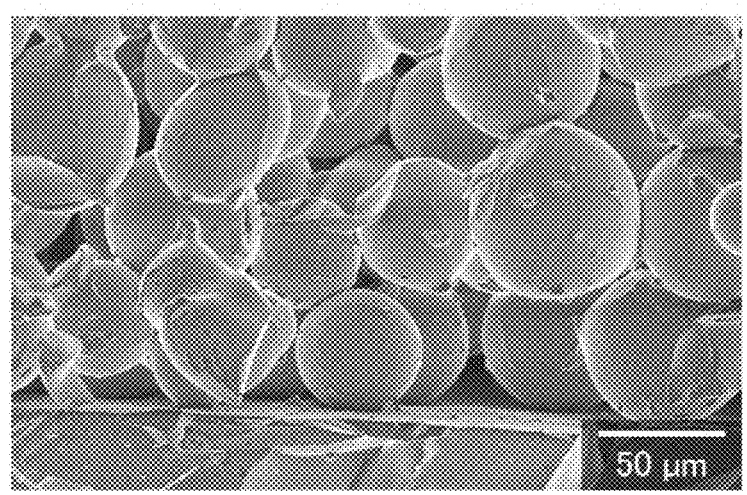
FIG. 2 is an SEM photograph in the vicinity of an interface between a dense silica glass and a porous silica glass in the composite silica glass made light diffusion member of the present invention.

Furthermore, as a result of observing the vicinity of the interface between the dense silica glass and the porous silica glass with SEM, it was confirmed as shown in FIG. 2 that the residual adhesive such as a silica powder as observed in a conventional silica bonded body is not observed in the porous silica glass part in the vicinity of the interface, and the porous silica glass has a homogeneous pore distribution from the vicinity of the interface to the outer surface thereof.

(2) Pore Size Distribution of Porous Silica Glass

Figure 3:
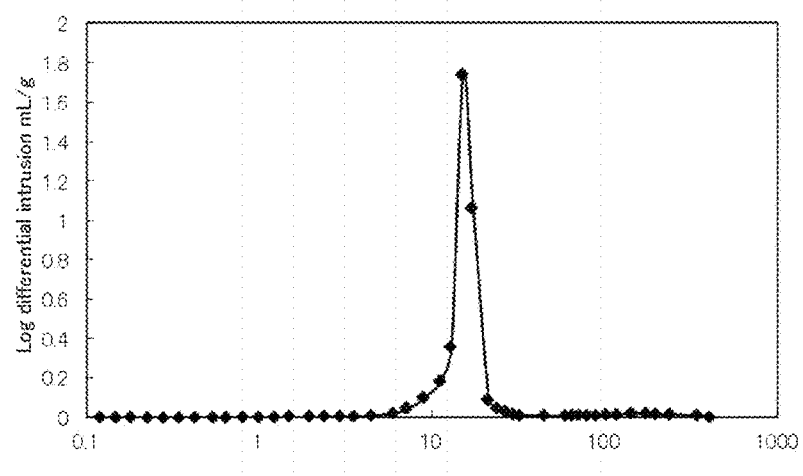
FIG. 3 is a graph showing pore size distribution of a porous silica glass constituting the composite silica glass made light diffusion member of the present invention.
Figure 4:
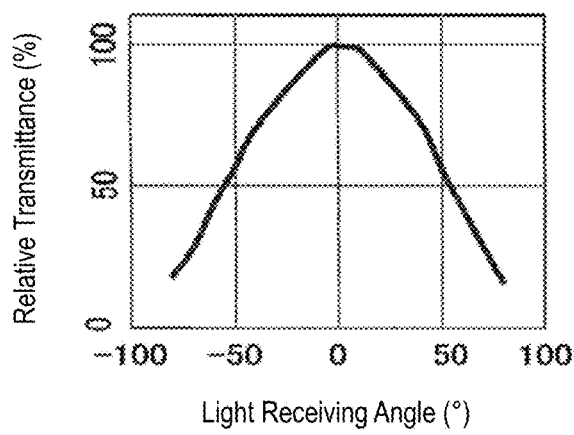
FIG. 4 is a graph showing the relationship of relative transmittance (%) to a light receiving angle (°) in a porous silica glass constituting the composite silica glass made light diffusion member of the present invention.

Porous silica glass in the composite silica glass made light diffusion member obtained was cut into a thickness of about 0.8 mm, and pore size distribution was measured. As a result, as shown in FIG. 3, the pore size was distributed in a range of about 5 μm to about 30 μm, the central pore size was 16.8 μm, and the porosity was 37.7%.

This measurement was performed by using the following measurement instrument according to JIS R1634:1998.

Mercury porosimeter: AutoPore IV 9500 (manufactured by Shimadzu Corporation)
Mercury surface tension: 485.0 dynes/cm
Mercury contact angle: 130.0°
Mercury density: 13.5335 g/ml (3) Particle Size Distribution and Circularity of Spherical Silica Glass in Porous Silica Glass 20 particles excluding particles having a shape that particles were bonded to each other were randomly selected from a SEM photograph, the longest diameter (1) and shortest diameter ($l_2$) thereof were measured, and its average value was used as a particle diameter of each particle. Circularity of spherical silica glass particle cross-section was calculated by $l_2/l_1$.

As a result, the particle diameters were distributed in a range of from about 20 μm to about 100 μm, and its average particle diameter was 39.2 μm.

The circularity of spherical silica glass cross-section was 0.93 or more.

(4) Surface Roughness Ra per Measurement Length of 1 μm of Spherical Silica Glass Exposed on Outer Surface of Porous Silica Glass Arithmetic average roughness Ra was measured by using a cantilever (silicon cantilever) having a spring constant of 3N/m and resonance frequency of 75 kHz, using an atomic force microscope (manufactured by Digital Instruments) in AC mode (tapping mode), and scanning surface shape of each sample. The measurement was performed by scanning on the maximum range 10 μm square of standard scanner, and thereafter, field diaphragm (enlargement) of visual field was performed such that the feature of surface shape was reflected. The calculation of the arithmetic average roughness Ra was carried out in 1 μm length. The arithmetic average roughness Ra was measured 10 times (n=10), and its average value was obtained.

The arithmetic surface roughness Ra of 20 spherical silica glasses exposed on the surface of the porous silica glass was measured each 10 times by the above method. As a result, average values of each 10 times were within a range of 3.1 to 3.9 nm.

(5) Optical Characteristic of Porous Silica Glass

Relative transmittance was measured by using an integrating sphere type measuring instrument. The relative transmittance is defined by the following formula, and shows the proportion of light intensity at an angle θ to emitted light intensity of emitting angle θ=0° of each sample.

$$\text{Relative transmittance}(\%) = \frac{[\text{Transmitted light intensity at light receiving angle } \theta°]}{[\text{Transmitted light intensity at light receiving angle } 0(\theta = 0°)]} \quad [\text{Math. 1}]$$

When the transmitted light intensity at the light receiving angle 0 (θ=0)° is 100, the emitting angle (degree of dispersion) when the relative transmittance is 50% of light intensity is 53°, and wide dispersibility was confirmed.

(6) Purity Analysis of Dense Silica Glass and Porous Silica Glass

Etching in a thickness of 10 μm was performed 5 times with a heated (130° C.) mixed acid of hydrofluoric acid (50%) and sulfuric acid (20%) from a dense silica glass side of the composite silica glass made light diffusion member obtained. The etching liquid at 5th time was cooled, and the concentration thereof was adjusted by pure water followed by measuring with ICP mass analyzer. The porous silica glass was partially crushed, the crushed grains were subjected to etching with the above heated mixed acid, and the etching liquid was measured in the same manner as above. The results are shown in Table 1.

TABLE 1

| | Na | Mg | Al | K | Fe | Cu |
|---|---|---|---|---|---|---|
| Dense silica glass | 0.088 | 0.025 | 0.100 | 0.100 | 0.110 | 0.002 |
| Porous silica glass | 0.079 | 0.021 | 0.095 | 0.093 | 0.129 | 0.002 |

(*) Unit of numerical values in Table 1 is ppm.

Comparative Example 1

Silica bonded body was prepared according to the method described in Patent Document 1 as shown below.
(Preparation of Silica Porous Body)

80 g of pure water and 500 g of 1% polyvinyl alcohol aqueous solution were added to 500 g of a silica powder having a particle diameter of 30 to 60 μm and an average particle diameter of 50 μm, followed by mixing with Henschel mixer, and a granulated powder of silica was obtained. The granulated powder obtained was placed in a mold having a diameter of 200 mm and a height of 12 mm, and pressure molded under a pressure of 0.5 kN/cm², and a molded body was obtained.

The molded body was dried at 120° C. for 2 hours, and maintained at a burning temperature of 1250 to 1500° C. for 10 hours to obtain a silica porous body.

In the silica porous body obtained, an average particle diameter of sintered silica particles was 50 μm, a particle distribution width was within ±50% of the average particle diameter, the pore diameter was 20 μm, the porosity was 45%, and the apparent density was 2.2 g/cm³.
(Production of Silica Bonded Body)

To a bonding face (10 mm×10 mm) of the silica porous body obtained (10 mm×10 mm×30 mm) was applied a binder prepared by adding 0.1 wt % of an acryl emulsion and 15 wt % of TEOS to a silica powder obtained by mixing a silica coarse particle having an average particle diameter of 15 μm with a silica fine powder having an average particle diameter of 2 μm in a weight ratio of 6.5:3.5, and the bonding face of the silica porous body was combined with a bonding face (10 mm×10 mm) of quartz glass (10 mm×10 mm×30 mm). Those were bonded by heat-treating in air at 1200° C. for 3 hours.

In the silica bonded body of Comparative Example 1, a silica powder intervenes in the vicinity of the interface between the silica porous body and the quartz glass. Therefore, the results were that as compared with Example 1, transmission efficiency of ultraviolet rays was poor and variation of ultraviolet intensity in silica bonded body face was large.

While the present invention has been described in detail and with reference to specific embodiments thereof, it will be apparent to one skilled in the art that various changes and modifications can be made therein without departing from the spirit and scope of the present invention. The present application is based on a Japanese patent application No. 2016-046569 filed on Mar. 10, 2016 and a Japanese patent application No. 2017-016833 filed on Feb. 1, 2017, the contents thereof being incorporated herein by reference.

The invention claimed is:

1. A composite silica glass made light diffusion member, comprising a dense silica glass and a porous silica glass, wherein the porous silica glass has been layered on the surface of the dense silica glass, wherein:
   the porous silica glass is a porous body which has a framework comprising a plurality of spherical silica glasses, comprises a communicating pore part formed by spaces among them, and has a central pore size of 10 to 20 μm and a porosity of 25 to 40%;

the spherical silica glasses have an average diameter of 30 to 100 μm and an average value obtained by measuring 10 times an arithmetic average roughness Ra per measurement length of 1 μm in each of the spherical silica glass exposed on an outer surface of the porous silica glass is 0.8 to 4.0 nm; and the porous silica glass has a homogeneous pore distribution from an interface with the dense silica glass to the outer surface of the porous silica glass.

2. The composite silica glass made light diffusion member according to claim 1, wherein the spherical silica glass has a cross-sectional circularity of 0.80 or more.

3. The composite silica glass made light diffusion member according to claim 1, wherein the porous silica glass has contents of Na, Mg, Al, K, and Fe of 0.2 ppm or less each, and a content of Cu of 0.05 ppm or less.

4. The composite silica glass made light diffusion member according to claim 2, wherein the porous silica glass has contents of Na, Mg, Al, K, and Fe of 0.2 ppm or less each, and a content of Cu of 0.05 ppm or less.

* * * * *